United States Patent [19]

Langumier

[11] 4,371,401
[45] Feb. 1, 1983

[54] BITUMINOUS MIXTURES FOR ROADS WITH VERY HIGH PERFORMANCES, METHOD FOR PRODUCING SAID MIXTURES AND THEIR APPLICATION ON ROADS

[75] Inventor: Georges Langumier, Saint Germain en Laye, France

[73] Assignee: Travaux et Produits Routiers, Paris, France

[21] Appl. No.: 269,978

[22] Filed: Jun. 3, 1981

[30] Foreign Application Priority Data

Jun. 5, 1980 [FR] France ............................ 80 12554

[51] Int. Cl.³ .............................................. C08L 95/00
[52] U.S. Cl. .................................. 106/281 R; 524/59
[58] Field of Search ........................ 106/281 R; 524/59

[56] References Cited

U.S. PATENT DOCUMENTS 4,274,882 6/1981 McAllister, Jr. ............... 106/281 R
4,287,263 9/1981 Woodring et al. ............. 106/281 R Primary Examiner—Lorenzo B. Hayes
Assistant Examiner—Amelia B. Yarbrough
Attorney, Agent, or Firm—Frost & Jacobs

[57] ABSTRACT

The bituminous mixtures for roads consist in a granular composition basically containing hard rock aggregate and a binder composed of very hard bitumens and possible additives and used in an amount corresponding to a corrected richness modulus $\kappa$ within the range of 3.8 to 4.5 in accordance with the relation:

$$\text{binder content} = K \sqrt[5]{\Sigma} \cdot \alpha, \text{ where}$$

$\Sigma$ = conventional specific surface-area of the aggregate = 0.25 G + 2.3 S + 12s + 135f, in m²/kg with the proportions by weight G representing the percentage of particles larger than 6 mm S representing the percentage of particles ranging from 6 to 0.315 mm s representing the percentage of particles ranging from 0.315 to 0.08 mm f representing the percentage of particles smaller than 0.08 mm K = corrected richness modulus $\alpha$ = corrective coefficient intended to take into account the mass per unit volume of the aggregate, $\alpha$ being equal to 2.65/mass per unit volume of the aggregate.

9 Claims, No Drawings

BITUMINOUS MIXTURES FOR ROADS WITH VERY HIGH PERFORMANCES, METHOD FOR PRODUCING SAID MIXTURES AND THEIR APPLICATION ON ROADS

This invention relates to bituminous mixtures for roads with very high performances, a method for producing said mixtures and their application of roads.

In all countries, road regulations allow running of vehicles with heavy axles, even if the limit-weight is higher or lower according to countries. The existence of such loads makes it necessary to use bituminous mixtures having a high creep resistance on roadways with a heavy dense traffic. It is essential to ensure a sufficient working life. This involves the use of an important amount of bituminous mixture.

However, due to various limitations, it is sometimes necessary to apply or lay a bituminous mixture of a thickness much lower than the conventional bituminous mixture thickness indispensable to obtain the required working life.

The characteristics for a bituminous mixture showing, at a reduced thickness, the same effect as a conventional bituminous mixture of normal thickness should be improved in two fields:
the flexure modulus which has to be increased;
the capacity of deformation under repeated loads which has to be augmented.

The purpose of the present invention is to provide bituminouds mixtures for roads with very high performances adapted to meet the above-stated requirements both in the field of creep resistance and the fields of modulus and of fatigue strength.

It is well known that the composition of bituminous mixtures for roads involves three main parameters, viz.:
the aggregate volume AV
the binder volume BV
the void volume v.

In the report of the XVIth Road World Congress, September 16-21, 1979, Wien (Austria), the following was specified:
the bituminous mixtures which have the best resistance to rutting are those whereof the compression modulus sensitivity to temperature is as low as possible;
this requirement may notably be met by the use of hard bitumens, the search of a high ratio between the aggregate content per volume and the binder content per volume (AV/BV) and of a low void percentage (v);
the bituminous mixtures having resistance to rutting and meeting the above-stated requirement (high AV/BV, low v, hard bitumen), if laid to a suitable thickness, will also resist to fatigue cracking. As concerns fatigue, however, it is advisable to avoid the use of bitumens having excessive hardness (either naturally or due to ageing) which could render the compositions liable to cracking of thermal origin;
besides the bitumen characteristics, the two composition parameters governing the fatigue phenomenon and the creep phenomenon are the AV/BV ratio and the void percentage v. The simultaneous obtention of a high AV/BV ratio and of a low void percentage v is governed by the particle-size, the aggregate shape and the compacting efficiency;
any mixture having a high AV/BV ratio, but a high void percentage v, may be resistant to rutting but poor as regards cracking and overall durability.

On the other hand, the researches effected by the applicant led to the following conclusions:
the mixtures characterized by a low binder content, such as required to have a high AV/BV ratio, have a rigidity modulus of high value and a high creep resistance;
such mixtures have a resistance to fatigue all the more low as their rigidity modulus is higher.

The applicant thus found that researches directed along the generally received line of opinion could not lead to the provision of bituminous mixtures with high performances.

Deviating from the teachings of the prior art, the applicant took up an unexpected line and found out, quite surprisingly, that the use of a very hard bitumen involves no drawback as concerns cracking, contrarily to the present knowledge, provided that a large amount of binder is used.

According to the invention, there was thus provided both unexpected and valuable results by using very hard bitumens in very large amounts, this leading to relatively low values of AV/BV.

From the present state of the art, it could not be anticipated that such bituminous mixtures, having a composition different from that recommended, would be satisfactory.

The bituminous mixtures according to the present invention have:
a very high rigidity modulus;
a very high capacity of deformation under alternating loads;
a very high creep resistance.

These are the characteristics sought for bituminous mixtures with very high performances.

According to the present invention, the bituminous mixtures for roads with very high performances having resistance to rutting and to cracking are characterized in that they consist in a granular composition basically containing hard rock aggregate and a binder composed of very hard bitumens and of possible additives and used in an amount corresponding to a corrected richness modulus K ranging from 3.8 to 4.5 in accordance with the relation:

$$\text{binder content} = K \sqrt[5]{\Sigma} \cdot \alpha,$$

where $\Sigma$ = conventional specific surface-area of the aggregate = $0.25\,G + 2.3\,S + 12\,s + 135\,f$, in square meters per kilogram (m²/kg) with the proportions by weight:
G representing the percentage of particles larger than 6 mm
S representing the percentage of particles ranging from 6 to 0.315 mm
s representing the percentage of particles ranging from 0.315 to 0.08 mm
f representing the percentage of particles smaller than 0.08 mm
K = correct richness modulus
$\alpha$ = corrective coefficient intended to take into account the mass per unit volume of the aggregate, $\alpha$ being equal to 2.65/mass per unit volume of the aggregate.

It should be noted that, according to the present invention, use may be made of aggregates of various natures. The most suitable aggregates are porphyries, calcareous rocks and the like.

Various specific characteristics, taken singly or in combination, of the bituminous mixtures of the present invention are recited hereunder:

the granular composition includes 10/20, 6/10, 2/6 gravels, a 0/2 sand and a calcareous filler mixed in the following amounts:
- Gravels: 10/20 mm mesh size 35 to 45%
- 6/10 mm mesh size 10 to 20%
- 2/6 mm mesh size 10 to 15%
- Sand: 0/2 mm mesh size 25 to 35%
- Filler: 0 to 5% the thus formed mixture being a 0/20 (2% refuse on a 20 mm-mesh screen);

the binder has a ball and ring temperature of 70° to 90° C., a penetrability at 25° C. of 5 to 20, a PFEIFFER penetration index $> 1$ and an embedding temperature of the order of 175° C.;

the modulus of rigidity is within the range from 160,000 to 240,000 bars (16 to $24 \times 10^9$ pascals);

the capacity of deformation under alternating loads is in the range from 200 to 300 $\mu D$ ($\mu D$ = microdeformations);

the creep resistance is in the range from 1 to 6 mm after 100,000 cycles in the L.C.P.C. rutting test effected at 50° C. on plates having a 10 cm thickness; (L.C.P.C.: Laboratoire Central des Ponts et Chaussees Official French Organization)

the possible additive added to the binder is usually a sequenced copolymer of styrene-butadienestyrene or of ethylene-vinyl acetate.

The present invention also relates to a method for producing such bituminous mixtures, consisting in heating the aggregate mixture to a temperature of about 160°–190° C. and incorporating in said aggregate the binder at a temperature ranging from 170° to 200° C., then kneading the mixture during 20 to 60 seconds.

According to further features of the present invention, the aggregate is wholly dry and heated, its water content being lower than 0.5%.

The method of the invention further consists in incorporating the possible additive directly in the mixture or previously in the binder prior to kneading and incorporation of the binder in the aggregate.

Said possible additive is usually a sequenced copolymer of styrene-butadiene-styrene or of ethylene-vinyl acetate.

The present invention also relates to the application on roads of such bituminous mixtures to a thickness of about 8 to 20 cm, more usually ranging from 10 to 15 cm.

The adjustment of the bituminous mixtures according to the invention is completely different from the prior art techniques. Said adjustment involves the following steps:

for a given granular composition and a given binder, applicant determines the maximum binder content which will afford good creep resistance;

for the same granular composition, a similar determination is made with binders of increasing hardness or of increasing polymer content.

As a result of such searches, a good creep resistance was found for a binder amount corresponding to a corrected richness module ranging from 3.8 to 4.5.

The following examples are given to illustrate the present invention by no way of limitation.

EXAMPLE 1

A. Aggregate

The aggregate used was 10/20, 6/10, 2/6 gravels, a 0/2 sand and a calcareous filler. The gravels and sand originated from the quarry of La Meillerrie-Tillay in Vendee (France). The filler is a calcareous filler of current use in granular formulations.

B. Characteristics of aggregate

Samples were taken from the quarry existing stocks for a preliminary study.

The identification tests made on these samples gave the results shown in table 1 hereunder.

The 0/2 sand contained 16% of fines. Its equivalent of sand, viz. 49, is markedly higher than the minimum specified for the sands containing more than 15% of filler for the construction of roadways courses, viz. 35.

The granulous texture of the faces is a favorable factor for resistance to rutting.

The Los Angeles coefficient has a value lower than 11. The gravels have a hardness meeting the specifications for rolling layers, including the case of the heaviest and most dense traffics.

The four granular fractions were wholly crushed.

The aggregate was mixed with the following proportions:
- 10/20 mm mesh size gravel = 35 to 45%
- 6/10 mm mesh size gravel = 10 to 20%
- 2/6 mm mesh size gravel = 10 to 15%
- 0/2 mm mesh size sand = 25 to 35%
- filler = 0 to 5%.

The thus formed mixture is a 0/20 = 2% refuse on a 20 mm-mesh screen. Its particle-size distribution is shown in the table hereunder.

| Screen mesh size in mm | Percentage of particles clearing the screens |
| --- | --- |
| 20 | 98 |
| 12.5 | 73 |
| 10 | 62 |
| 4.0 | 42 |
| 2.0 | 32 |
| 1.0 | 22 |
| 0.500 | 16 |
| 0.200 | 11 |
| 0.080 | 8.4 |

EXAMPLE 2

Binder

The binder used was formulated from direct distillation bitumens and from additive. It was specially prepared for the production of gravel-bitumen with very high performances.

The characteristics of the special bitumen are compared, in table 2, with those of three reference road bitumens covering the overall range of conventional road bitumens.

TABLE 1

| | 10/20 6/10 2/6 | 0/2 | SPECIFICATIONS | FILLER |
| --- | --- | --- | --- | --- |
| Nature | microdiorite | | L.A. dependent on the traffic classes as de- | calcareous |

TABLE 1-continued

|  | 10/20 | 6/10 | 2/6 | 0/2 | SPECIFICATIONS | | | FILLER |
|---|---|---|---|---|---|---|---|---|
|  |  |  |  |  | fined in the Catalogue de "Structures - types de chaussees" (1977 edition) | | | |
| Specific weight of particles | 2.91 | | | 2.9 | | | | — |
| Percentage of particles insolubles in hydrochloric acid |  |  |  | 100 | T1 to T3 | | T0 | ≃0 |
| LOS ANGELES coefficient (L.A.) |  | 6 to 11 | | | <30 | | <25 | — |
| Shape coefficient of the gravels |  | — | — | | S.E. dependent on the percentage of filler in the 0/2 fraction | | | — |
| Angularity | | entirely crushed | | | | | | |
| Face texture | | granulous | | | <12% | 12 to 15% | >15% | — |
| Sand equivalent (S.E.) as measured on the sand itself | — | | | 49 | >45 | >40 | >35 | — |

TABLE 2

| Binders | Bitumen of the invention | Reference bitumens | | |
|---|---|---|---|---|
|  |  | 20/30 | 60/70 | 180/220 |
| Ball and ring temperature | 70 to 90° C. | 52–65° C. | 43–56° C. | 39–48° C. |
| Penetrability at 25° C. | 5 to 20 | 18 | 64 | 200 |
| PFEIFFER penetration index | >1 | −0.3 | −0.3 | −0.5 |
| Embedding temperature | 175° C. | 170° C. | 145° C. | 130° C. |

The ball and ring temperature, higher than that of the 20/30, indicates that the special binder will retain more consistency than the 20/30 at a high temperature (60° C.), this rendering the road bituminous mixture free from creep-deformation.

The embedding temperature of the special binder is of 175° C., i.e. slightly higher than the embedding temperature of a 20/30 bitumen.

EXAMPLE 3

Behaviour tests

The following tests were effected:
determination of the characteristics which the embedded product in position will exhibit immediately and checking of the water behaviour of the embedded products (expanded DURIEZ test according to the procedures of June, 1979, of the Laboratoire Central des Ponts et Chaussees L.C.P.C.),
determination of the characteristics which the embedded product in position will exhibit after a prescribed time (Marshall test) according to the procedures of December, 1972, of the Laboratoire Central des Ponts et Chaussees),
checking of the rutting behaviour;
determination of the purely tensile properties.
The general characteristics are the following:
percentage of retained binder (P) ... 6%
theoretical density (TD) ... 2.66 specific surface-area $\Sigma = 13.2 \text{ m}^2/\text{kg}$ $\sqrt[5]{\Sigma} = 1.67$ corrected richness module:

$$K = \frac{2.91}{2.65} \cdot \frac{6}{1.67} = 3.95.$$

1-Duriez tests (a) Characteristics of the "EXPANDED DURIEZ" type samples

Behaviour tests were effected on the "Expanded Duriez" samples to show that the bituminous mixtures according to the invention are satisfactory.

The prepared mixtures were kneaded during about one minute.

The samples were prepared by being held under a 18-metric ton load for 5 minutes, then removed from the mold 24 hours after their preparation. They were then classed so as to form three series having the same average density. Their characteristics are the following:

| Hydrostatic apparent density (Da) | 2.25 |
|---|---|
| Void percentage (V) | 4% |
| Compacity (C) | 96% |
| Filling coefficient (FC) | 77% |

(b) Immersion-compression

The first series of 3 samples was crushed after being held in air for 7 days subsequent to removal from the mold.

The maximum breaking stress under simple compression, as expressed per unit of cross-sectional area of the sample, at 18° C. and 1 mm/s after a standing period of 8 days in air, Rc, amounts to 220 bars.

The second series of 3 samples was immersed, after being degassed, during 7 days, then removed from the water.

The samples were crushed, then their water content was determined. The measurements gave the following results:
the maximum breaking stress under simple compression, as expressed per unit of cross-sectional of the sample, at 18° C. and 1 mm/s, after a standing period of 24 hours in air plus seven days in water (R'c) amounts to 221 bars.
the water content at time of crushing after immersion is 0.4%.
the immersion-compression reduction coefficient ic=R'c/Rc=1.

2. Diametral compression

Another series of 3 samples was held 8 days in air, then crushed under diametral compression at 18° C. and 1 mm/s; the maximum stress under diametral compression Rt amounts to 55 bars.

The bituminous mixtures of the invention are excellent as regards their resistance under simple compression and diametral compression, as well as their water behaviour.

3. Marshall tests

The tests effected under standardized conditions gave the following results:

| Number of impacts | 50 | 100 |
|---|---|---|
| Hydrostatic apparent density | 2.54 | 2.57 |
| Compacity (c) | 95.5% | 96.6% |
| Voids (V) | 4.5% | 3.4% |
| Stability (daN) | 2900 | 3100 |

4. Rutting test

Resistance to rutting was examined under traffic action simulation by means of a rutting device on laboratory-made plates of 500×180×100 mm.

(a) Characteristics of the samples

The tests were effected on two 10-cm plates which were compacted in an attempt to reach 100% compacity. The characteristics of the plates are as follows:

| thickness (cm) | 10 |
|---|---|
| geometrical apparent density | 2.55 |
| relative compacity with respect to DURIEZ density | 102% |
| Percentage of geometrical voids | 4% |

(b) Test conditions

The test were made by applying a 500 daN load through a wheel having its tire inflated at 6 bars and driven in a reciprocating translation motion at a frequency of 1 Hz during 100,000 cycles (200,000 passes) at 50° C. in accordance with the test standards for bituminous mixtures intended to form basic layers.

| Inflation pressure | 6 bars |
|---|---|
| Applied load | 500 daN |
| Skidding angle | 0° |
| Motion frequency | 1 Hz |
| Temperature | 50° C. |

(c) Measurement of the rut depth

The rut depth was measured by comparing with the initial outline subsequent outlines drawn along three profiles by means of a cross-contour micro-tracer, after subjection of each sample to:
- 1,500 cycles or 3,000 wheel passes
- 6,000 cycles or 12,000 wheel passes
- 25,000 cycles or 50,000 wheel passes
- 100,000 cycles or 200,000 wheel passes The results obtained are expressed in mm in the table hereunder:

| Number of cycles | Sinking in mm with respect to the initial contour |
|---|---|
| 400 | 1.2 |
| 1,500 | 1.8 |
| 6,000 | 2.8 |
| 25,000 | 3.7 |
| 100,000 | 4.4 |

The quite limited depth of the rut, viz. 4.4 mm at 50° C., evidences a remarkable behaviour of the bituminous mixtures according to the invention, even if the applied bituminous mixture is thin.

The invention is not limited to the embodiments described in details and various modifications may be brought thereto within the scope of the following claims.

What we claim:

1. High performance bituminous mixtures for roads having resistance to rutting and to cracking, wherein the said mixtures consist in a granular composition basically containing hard rock aggregate and a binder composed of very hard bitumens used in an amount corresponding to a corrected richness modulus K ranging from 3.8 to 4.5 in accordance with the relation:

$$\text{binder content} = K \sqrt[5]{\Sigma \cdot \alpha}$$

where $\Sigma$ =conventional specific surface-area of the aggregate=0.25 G+2.3 S+12 s+135 f, in square meters per kilogran (m²/kg) with the proportions by weight:
G representing the percentage of particles larger than 6 mm,
S representing the percentage of particles ranging from 6 to 0.315 mm,
s representing the percentage of particles ranging from 0.315 to 0.08 mm,
f representing the percentage of particles smaller than 0.08 mm,
K=corrected richness modulus,
$\alpha$=corrective coefficient intended to take into account the mass per unit volume of the aggregate,
said binder having a ball and ring temperature of 70° to 90° C., a penetrability at 25° C. of 5 to 20, a PFEIFFER penetration index >1, and an embedding temperature of 175° C.

2. Bituminous mixtures according to claim 1 wherein the module of rigidity is in the range of 160,000 to 240,000 bars (16 to 24×10⁹ Pa).

3. Bituminous mixtures according to claim 1, wherein the capacity of deformation under alternating loads is in the range of 200 to 300 $\mu$D.

4. Bituminous mixtures according to claim 1, wherein the creep resistance is in the range of 1 to 6 mm.

5. Bituminous mixtures according to claim 1 including an additive comprising a sequenced copolymer of styrene-butadiene-styrene or of ethylene-vinyl-acetate.

6. Bituminous mixtures according to claim 1 wherein the granular composition includes gravel, sand and a calcareous filler mixed in the following proportions:
10/20 mm mesh size gravel ... 35 to 45%
6/10 mm mesh size gravel ... 10 to 20%
2/6 mm mesh size gravel ... 10 to 15%
0/2 mm mesh size sand ... 25 to 35%
filler ... 0 to 5% the thus formed mixture being a 0/20 (2% refuse on a 20 mm-mesh screen).

7. A method for producing bituminous mixtures according to claim 1, wherein said method consists in heating the aggregate mixture to a temperature of about 160°–190° C. and incorporating in said aggregate the binder at a temperature ranging from 170° to 200° C., then kneading the mixture during 20–60 seconds.

8. A method according to claim 7 wherein the aggregate is wholly dry and heated, its water content being lower than 0.5%.

9. A method according to claims 7 or 8, wherein said method further consists in incorporating a copolymer directly in the mixture or previously in the binder prior to kneading and incorporation of the binder in the aggregate.

* * * * *